United States Patent
Cornwell et al.

(10) Patent No.: US 8,024,731 B1
(45) Date of Patent: Sep. 20, 2011

(54) ASSIGNING PRIORITIES TO THREADS OF EXECUTION

(75) Inventors: Michael J. Cornwell, San Jose, CA (US); Christopher P. Dudte, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1182 days.

(21) Appl. No.: 11/739,832

(22) Filed: Apr. 25, 2007

(51) Int. Cl.
*G06F 9/46* (2006.01)

(52) U.S. Cl. .......................... 718/100; 718/102; 718/103

(58) Field of Classification Search .................. 718/100, 718/102, 103
See application file for complete search history.

(56) References Cited

U.S. PATENT DOCUMENTS

| | | | | |
|---|---|---|---|---|
| 6,349,321 | B1 * | 2/2002 | Katayama | 718/103 |
| 6,378,006 | B1 * | 4/2002 | Murata | 719/321 |
| 7,103,735 | B2 * | 9/2006 | Iyer | 711/158 |
| 7,234,139 | B1 * | 6/2007 | Feinberg | 718/1 |
| 7,257,814 | B1 * | 8/2007 | Melvin et al. | 718/104 |
| 7,380,038 | B2 * | 5/2008 | Gray | 710/243 |
| 7,380,062 | B2 * | 5/2008 | Frommer et al. | 711/118 |
| 7,454,600 | B2 * | 11/2008 | Burns et al. | 712/219 |
| 7,518,993 | B1 * | 4/2009 | Dennis | 370/235 |
| 7,536,689 | B2 * | 5/2009 | Mangan | 718/100 |
| 7,571,283 | B2 * | 8/2009 | Frommer et al. | 711/118 |
| 7,631,308 | B2 * | 12/2009 | Bishop et al. | 718/102 |
| 2003/0110203 | A1 * | 6/2003 | Brenner et al. | 709/103 |
| 2003/0110204 | A1 * | 6/2003 | Brenner et al. | 709/103 |
| 2003/0191794 | A1 * | 10/2003 | Brenner et al. | 709/103 |
| 2003/0236815 | A1 * | 12/2003 | Brenner et al. | 709/104 |
| 2004/0216106 | A1 * | 10/2004 | Kalla et al. | 718/100 |
| 2006/0136915 | A1 * | 6/2006 | Aingaran et al. | 718/100 |
| 2006/0136919 | A1 * | 6/2006 | Aingaran et al. | 718/100 |
| 2006/0184946 | A1 * | 8/2006 | Bishop et al. | 718/102 |
| 2007/0204270 | A1 * | 8/2007 | Shin | 718/103 |
| 2008/0263325 | A1 * | 10/2008 | Kudva et al. | 712/203 |

OTHER PUBLICATIONS

Patterson, "RAM vs ROM", Oct. 28, 2006, pp. 1-2, http://www.associatedcontent.com/article/78792/how_to_explain_ram_vs_rom_to_beginners.html?cat=15.*

"Computer Storage: RAM vs. Hard Drive Space", 2006, pp. 1-2, http://www.thecomputerwizard.biz/memoryarticle.htm.*

Kozierok, "Random Access Memory (RAM)", 2004, pp. 1-2, http://www.pcguide.com/ref/ram/typesRAM-c.html.*

Atwood, "Why Does Vista Use All My Memory", Sep. 22, 2006, pp. 1-34, http://www.codinghorror.com/blog/2006/09/why-does-vista-use-all-my-memory.html.*

* cited by examiner

*Primary Examiner* — Emerson C Puente
*Assistant Examiner* — Charles M Swift
(74) *Attorney, Agent, or Firm* — Fish & Richardson P.C.

(57) ABSTRACT

Systems and processes may be implemented to receive threads of execution and assign priorities to the threads of execution. Threads of execution may include nonvolatile memory input/output threads, other input/output threads, and/or other non-input/output threads. A lower priority may be assigned to nonvolatile memory input/output threads than other input/output threads. An algorithm may determine an order of execution of the threads of execution. An order of execution may be at least partially based on assigned priorities.

20 Claims, 6 Drawing Sheets

ASSIGNING PRIORITIES TO THREADS OF EXECUTION

TECHNICAL FIELD

The present invention relates to systems and processes prioritizing operations for a memory and more particularly to prioritizing threads of execution for a memory.

BACKGROUND

Threads of execution ("threads") are portions of an application or an operation. An application or an operation may be split into multiple threads. Threads allow an application or an operation to be split into simultaneous or approximately simultaneous tasks. Threads may be executed in parallel. A processor switches between different threads using time slicing to give an appearance that the threads are executed simultaneously. Switching may occur quickly to give a user the appearance that threads and/or operations are being executed simultaneously. For example, multiple programs, such as media player and other applications, may be executed. The processor may switch between the programs using time slicing so that the programs may be run concurrently. Some computer systems include multiple processors which allow threads to be run simultaneously on the processors, often called multiprocessing.

SUMMARY

Systems and processes may assign priorities to threads of execution based on the type of thread. An order of execution may be determined at least partially based on assigned priorities. Threads may be executed by a processor of a device in the determined order of execution. Rather than assigning the same priority to all input/output threads of execution, priorities may be assigned based on the type of input/output thread of execution to increase processing speed.

In one general aspect, threads of execution are received, and a lower priority is assigned to nonvolatile memory input/output threads than other input/output threads. Other input/output threads may also be received from an external host.

Implementations may include one or more of the following features. Threads of execution may be executed based on an algorithm. An algorithm may determine an order of execution at least partially based on assigned priorities and/or time lapsed after receipt of a thread of execution. Other input/output threads of execution may be received from a USB coupled to an external host. Other threads of execution may be received. A higher priority may be assigned to input/output threads of execution than other threads of execution.

In another general aspect, a lower priority is assigned to nonvolatile memory input/output threads than other input/output threads, and an order of execution for one or more of the nonvolatile memory input/output threads and the other input/output threads is determined at least partially based on an algorithm. The algorithm determines the order of execution at least partially based on assigned priorities.

Implementations may include one or more of the following features. An algorithm may determine an order of execution at least partially based on time lapsed after receipt of a thread of execution. A higher priority may be assigned to input/output threads than other threads. An order of execution for the other threads may be determined. Input/output threads may be received from an external host.

In one general aspect, a queue is operable to store threads of execution. A priority analysis module coupled to the queue is operable to assign a higher priority to input/output threads than the other threads and assign a lower priority to the nonvolatile memory input/output threads than the other input/output threads. The algorithm is used to determine the order of execution of the threads of execution.

Implementations may include one or more of the following features. The algorithm may determine an order of execution at least partially based on assigned priorities and/or time lapsed after receipt of a thread of execution. At least one or more of the other input/output threads may be transmitted from an external host via a bus.

The details of one or more implementations are set forth in the accompanying drawings and the description below. Other features will be apparent from the description, the drawings, and from the claims.

DESCRIPTION OF DRAWINGS

Like reference symbols in the various drawings indicate like elements.

DETAILED DESCRIPTION

Figure 1:
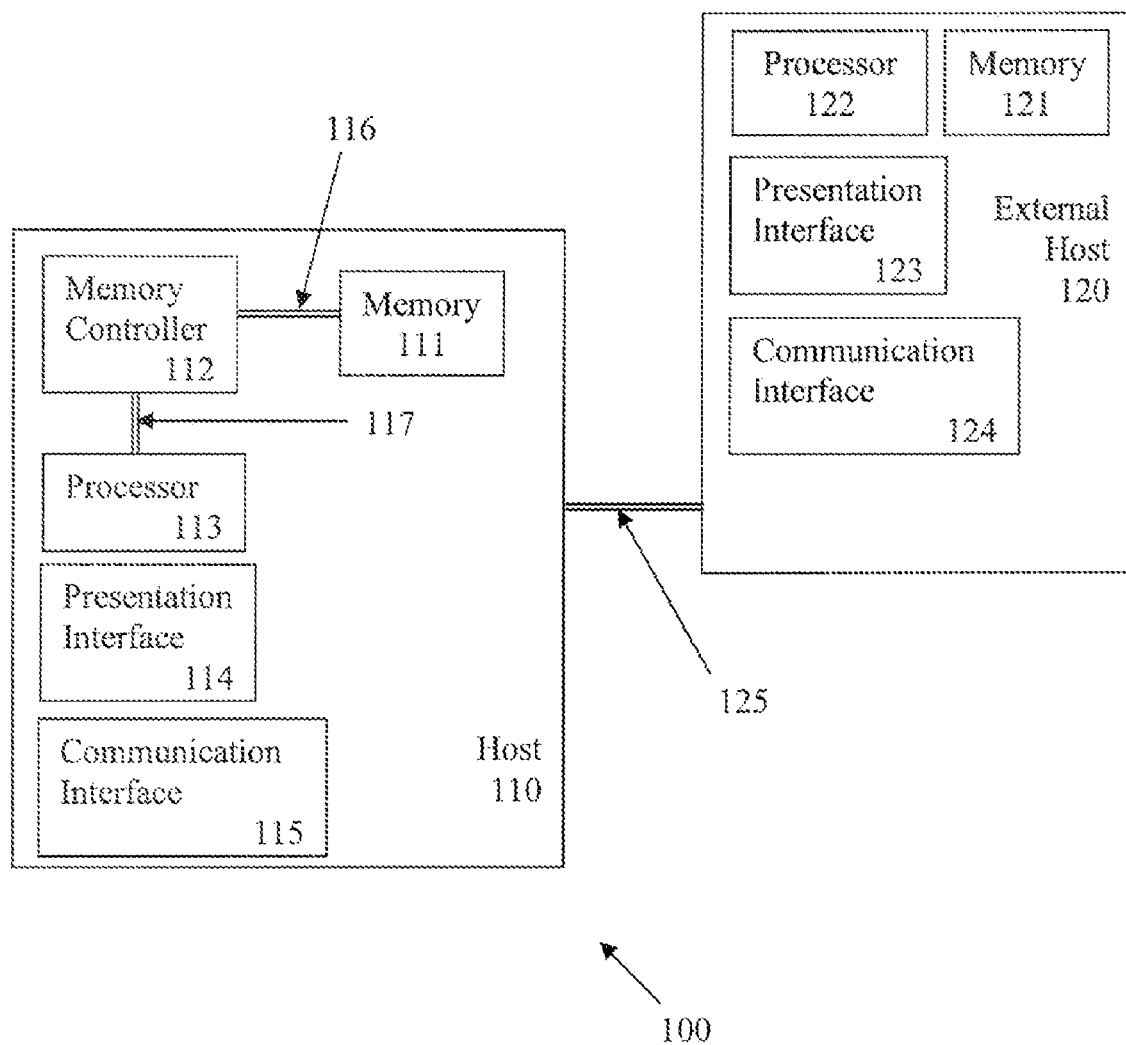
FIG. 1 illustrates an example of a host and an external host.

FIG. 1 illustrates an example system 100. System 100 may include a host 110. Host 110 may be any electronic or computing device that uses nonvolatile memory including, for example, portable and desktop computers, clients, servers, consumer electronics, calculators, network appliances, media players/recorders, game consoles, mobile phones, email devices, personal digital assistants (PDAs), embedded devices, televisions, system-on-chip (SoC), set-top boxes, audio recorders, handheld data collection scanners, and/or monitoring devices. Host 110 may include a memory 111, a memory controller 112, a processor 113, a presentation interface 114, and/or a communication interface 115. Memory controller 112 and/or processor 113 may include individual chips, a chip set, or can be integrated together on a single chip (e.g., a SoC solution).

Memory 111 may be nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), nonvolatile random-access memory (NVRAM), non-volatile static random-access memory (nvSRAM), phase-change memory (PRAM), and/or any other memory that does not need its memory contents periodically refreshed and/or can retain information without power. Memory 111 may include memory chips or memory modules (e.g., single in-line memory modules (SIMMs) or dual in-line memory modules (DIMMs)). In some implementations, memory 111 may be electrically erasable. Memory 111 may have a finite number of write/erase cycles. For example, after a number of write/erase cycles, the ability of a cell of memory 111 to maintain a specified charge may be impaired. For example, a memory cell may leak electrons. As another example, an electric charge may not be substantially removable from a memory cell. Cells of a nonvolatile memory may not be individually erasable, such as in flash memory. For example, a cell of a block may be erased by erasing the entire block in which the cell resides. Similarly, writing new data to a portion of a block may require erasing the entire block and rewriting any unchanged portions of the block along with the new data.

Figure 2:
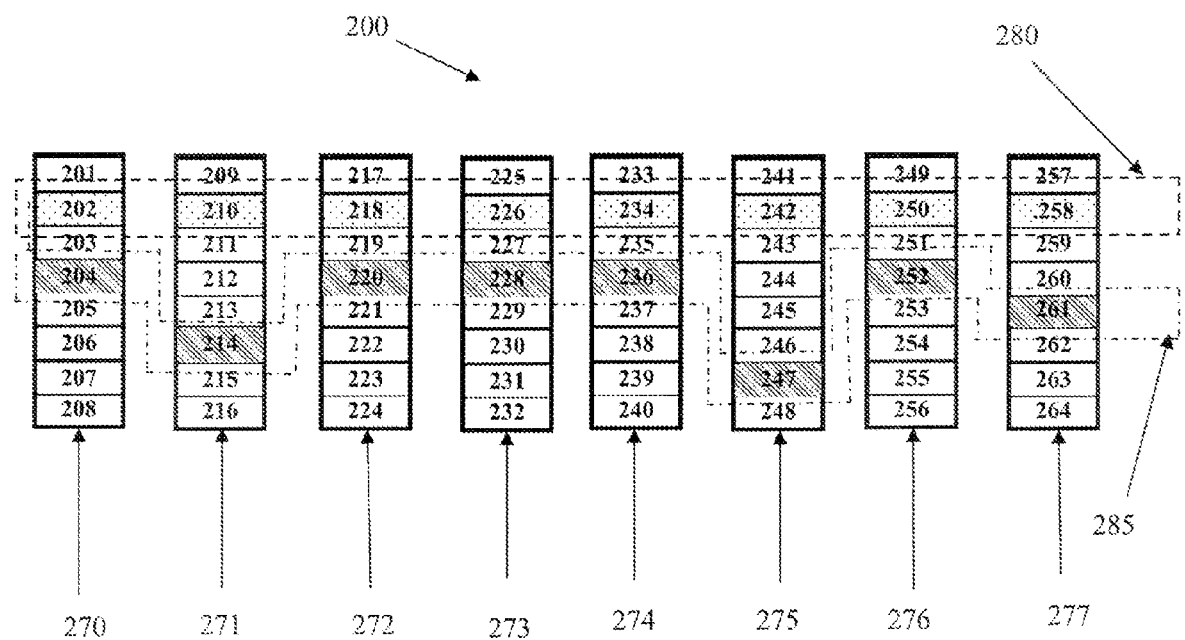
FIG. 2 illustrates an example configuration of a memory.

In some implementations, memory may be interleaved to increase performance of the host. FIG. 2 depicts a representation of a portion of a memory 200. Memory 200 may include physical blocks 270-277. Each physical block 270-277 may include cells 201-264. For example, physical block 270 may include cells 201-208 and physical block 271 may include cells 209-216. The physical blocks 270-277 and cells 201-264 depicted in FIG. 2 are for purposes of illustration and do not represent a typical implementation. For example, in the case of flash memory, physical blocks typically include a much larger number of cells (e.g., sufficient to store 512 or 2048 bytes), which may be divided into pages (e.g., of 64 bytes), although any size of physical blocks and any number of cells can be used.

During operation, memory 111 may receive signals from memory controller 112 over Input/Output (I/O) bus 116, which enables memory 111 to carry out memory access requests (e.g., read or write operations) received by the memory controller 112 from the processor 113 (see FIG. 1). Memory 111 may be interleaved, so that read or write requests to logical block addresses 280 and 285 (LBAs) are mapped to physical memory addresses that include two or more physical blocks 270-277 (see FIGS. 1 and 2). Interleaving may increase performance (e.g., by decreasing read and/or write times by allowing multiple parallel reads or writes) or protecting against lost data (e.g., by providing some degree of redundancy across different physical blocks) of memory 111. Host 110 (e.g., using processor 113) may perform reads and writes to LBAs 280, 285, which are mapped or translated (e.g., by memory controller 112) to physical block addresses 270-277 of memory. For example, LBA 280 includes cells 202, 210, 218, 226, 234, 242, 250, and 258 and LBA 285 includes cells 204, 214, 220, 228, 236, 247, 252, and 261. In some situations, mapping may help make a memory appear similar to a hard disk drive to the host (e.g., to the operating system of the processor).

In some implementations, physical blocks may be mapped to virtual blocks. Virtual blocks may make a memory appear continuous. For example, bad blocks may be omitted from a virtual block listing. Virtual blocks may be mapped to LBAs to increase memory performance by allowing interleaving.

Memory controller 112 may be any device that manages memory access including, for example, programmable memory controllers, flash disk controllers, direct memory access (DMA) controllers, logic devices, field-programmable gate arrays (FPGAs), and/or central processing units (CPUs). Examples of memory controller 112 may include the family of ATA Flash Disk Controllers (e.g., device nos. SST55LD019A, SST55LD019B, SST55LD019C, etc.), manufactured by Silicon Storage Technology, Inc. (Sunnyvale, Calif.). In some implementations, memory controller 104 supports single-level cell (SLC) and/or multi-level cell (MLC) flash media.

In some implementations, memory controller 112 may recognize control, address, and/or data signals transmitted on bus 117 by processor 113. Memory controller 112 may translate the control, address, and/or data signals into memory access requests on memory 111. Bus 117 may be an Integrated Drive Electronics (IDE)/Advanced Technology Attachment (ATA) bus that transfers control, address and data signals using IDE/ATA standard bus protocol (e.g., ATA-6 bus protocol). IDE/ATA signals may be generated by processor 113 and translated by the memory controller 112 into memory access requests in a format or protocol appropriate for communicating with the memory 111 across bus 116.

Processor 113 may include a programmable logic device, a microprocessor, or any other appropriate device for manipulating information in a logical manner. A processor may execute the operating system for the host. An example of processor 113 is a PP5002 Superintegration™ SoC controller manufactured by PortalPlayer, Inc. (San Jose, Calif.). The PP5002 controller may provide a platform for media player/recorder systems and/or other products that use non-volatile memory.

During use, an application running on processor 113 may request access to data stored on memory 111, see FIG. 1. For example, a user of a host 110 (e.g., a media player/recorder) or an external host 120 (e.g., a desktop or laptop computer) connected to the host 110 may submit a request to save a song to memory 111. A media player/recorder application may send the request to an operating system running on the processor 113, which formats the request into IDE/ATA signals. IDE/ATA signals may be transmitted to memory controller 112 on bus 117 by processor 113. Memory controller 112 may translate the request to access memory 111 via bus 116.

In some implementations, processor 113 may include memory controller 112. For example, the processor 113 and memory controller 112 may be an integrated processor unit. Processors with integrated memory controllers may be commercially available from Freescale Semiconductor (Austin, Tex.) and Texas Instruments (Dallas, Tex.). Utilizing an integrated processor 113 and memory controller 112 may decrease production cost of host 110, facilitate manufacture of host 110, and/or make process execution more efficient. For example, utilizing a single processor/memory controller decreases the number of steps in fabrication.

Presentation interface 114 may present data such as videos, music, messages from the host 105 and/or external host 120, graphical interface for various applications stored on the host (e.g., graphical interface for playing music, videos, manipulating data, etc). For example, presentation interface 114 may present data in visual and/or audio format. Presentation interface 114 may include display device, such as a screen, and/or speakers. Presentation interface may include a graphical interface.

Communication interface 115 may allow communication with other devices. Communication interface 115 may transmit data from host 110 to, and/or receive data from, external host 120 via network protocols (e.g., TCP/IP, Bluetooth, and/or Wi-Fi) and/or a bus (e.g., serial, parallel, USB, and/or FireWire).

Figure 3:
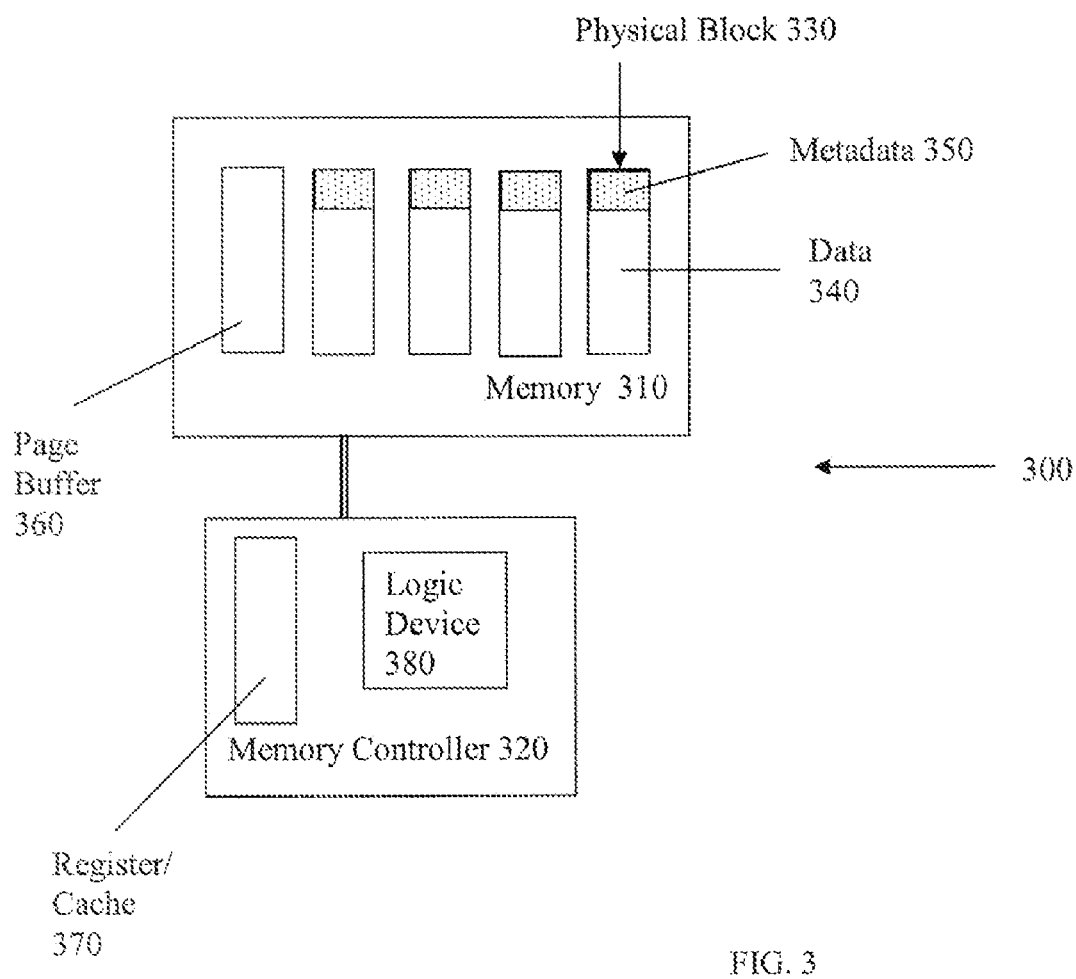
FIG. 3 illustrates an example of a memory controller coupled to a memory.

FIG. 3 illustrates a portion 300 of a host including a memory 310 and a memory controller 320. Memory 310 may include physical blocks 330 that store data 340 or are capable of storing data. A portion of a physical block 330 may store metadata 350. Metadata may include information about other data in the memory, such as listings of bad blocks in a memory or error correcting codes. Memory 310 may include a first buffer 360 (e.g., a page buffer) that is used to temporarily store data as it is being written to or read from the blocks 330. Memory controller 320 may include or be coupled to a second buffer 370 (e.g., a register or a cache). Second buffer 370 may be a volatile memory such as RAM or a nonvolatile memory such as flash memory.

Memory controller 320 may include a logic device 380 that interprets operations from a host or external host and/or performs operations on a coupled memory. Memory controller 320 operations may include use of at least two buffers 360 and 370 to facilitate operations (e.g., read or write), facilitate random data access operations, and/or increase performance. For example, memory controller 320 may read data from memory 310. In response to a read request from memory controller 320, data from data portion 340 of memory 310 may be loaded into first buffer 360 (e.g., data register or page register). The data in the first buffer 360 may be transmitted to second buffer 370 (e.g., cache, register, or cache register) which is coupled to memory controller 320. The second buffer 370 may accumulate multiple pages of data from the first buffer. Memory controller 320 may reformat data from second buffer 370 for delivery to processor 113 of the host 110 (see FIG. 1) (e.g., in IDE/ATA format). While or after data is transferred from first buffer 360 to second buffer 370, additional data may be loaded from data portions 340 of memory 310 to the first buffer 360.

Memory controller 320 may also input data received from a host or external host into second buffer 370 (e.g., cache) for programming of the array through first buffer 360.

The memory controller 320 may receive requests to read and/or write data to memory 310. The memory controller 320 may format the requests to an instruction format appropriate for the memory 310 (e.g., from or to IDE/ATA format). The memory controller 320 may then transfer the instructions in the appropriate format to the memory 310. The requests in the memory 310 may then be converted to the appropriate electrical charges or the appropriate portions of the memory may be transferred to the second buffer.

Although the above description discusses portions of each block as being for data and/or for metadata, portions of a block that are used for data or metadata may not be fixed. A particular portion of a block may include metadata at some times and include user data or other data at other times.

Host 110 may be coupled to an external host 120, as illustrated in FIG. 1, to transmit and/or receive data. For example, songs and/or videos may be downloaded from external host 120 (e.g., computer) to host 110, which may be a media player or other portable device. As another example, applications, such as firmware, operating systems, software for playing MP3s, software for playing videos and/or upgrades, updates, and/or modifications to applications (e.g., change in available features such as playlists) may be downloaded from external host 120 to host 110. Furthermore, data from the host 110 may be uploaded to external host 120. In addition, host 110 may be coupled to external host 120 to modify data on memory 111 of the host and/or memory 121 of the external host. Host 110 may be coupled to external host 120 to initiate and/or execute processes on the host.

Host 110 may be temporarily coupled to external host. For example, host 110 may be coupled to external host 120 using a connector 125 (e.g., serial bus, parallel bus, USB, and/or FireWire). Connector 125 may be an electrical connector. Connector 125 may allow a removable connection between host 110 and external host 120. A temporary coupling between host 110 and external host 120 may allow the host, such as a portable device, to be disconnected from the external host and/or physically moved away from the external host.

Host 110 may be wirelessly coupled to external host 120. Data may be transmitted using one or more network protocols (e.g., TCP/IP, Wi-Fi, 802.11g, 802.11n, IR or Bluetooth).

External host 120 may be any electronic or computing device including, for example, portable and desktop computers, clients, servers, consumer electronics, network appliances, etc. An external host 120 may include a memory 121, a processor 122, a presentation interface 123, and/or a communication interface 124.

Memory 121 may be a volatile memory (e.g., RAM) and/or nonvolatile memory (disk drive, flash memory, or other suitable memories). Processor 122 may be a programmable logic device, a microprocessor, or any other appropriate device for manipulating information in a logical manner. Presentation interface 123 may present data. Communication interface 124 may allow communication with other devices, such as host 110.

Figure 4:
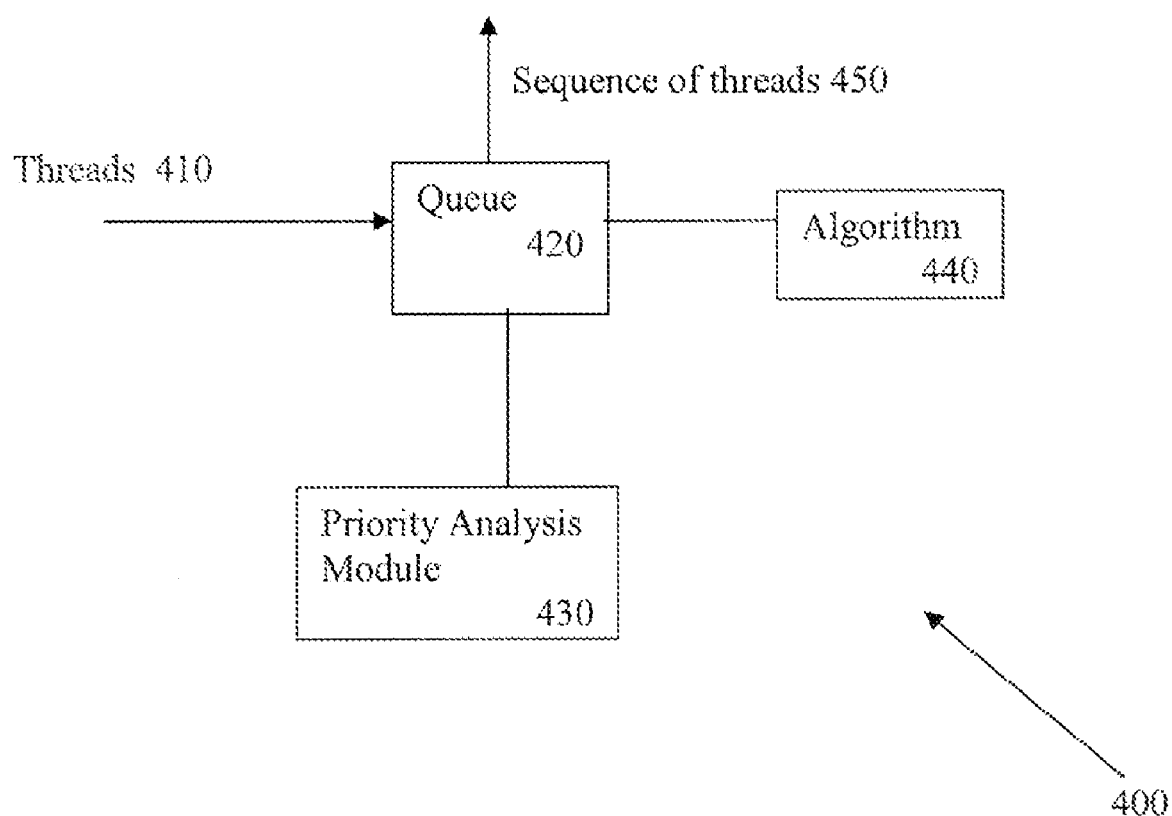
FIG. 4 illustrates an example of a system for assigning priorities to threads.

FIG. 4 illustrates an example system 400. System 400 may receive and sequence threads of execution. System 400 may include a queue 420, a priority analysis module 430, and an algorithm 440. Queue 420 may be a memory coupled to a processor or memory controller of the host. For example, queue may be second buffer 370 as illustrated in FIG. 3. Queue may retrieve and/or receive threads of execution.

Threads of execution 410 may be sent to a processor of a host. Threads of execution may be input/output threads (e.g., threads associated with input/output operations with respect to the processor) or other types of threads (e.g, LCD refresh threads; hardware monitoring threads, such as hardware temperature monitoring threads, hardware voltage monitoring threads, and/or hardware connection monitoring threads; user interface threads, related to user interfaces such as, buttons, switches, and/or sensors; error handling threads; and/or housekeeping threads). Input/output threads may be memory threads (e.g., nonvolatile memory threads such as NAND driver threads) or other input/output threads (USB threads, network threads, or WiFi threads).

The processor may transmit the threads of execution 410 to the queue 420. Queue 420 may store the threads. Memory may include a priority analysis module 430 executable by the processor. Priority analysis module 430. Priority analysis module 430 may be executable to assign priorities to threads. A priority may be a relative designation such as a number. For example, a high priority thread may be assigned a first priority number and a lower priority thread may be assigned second priority number lower than the first priority number. The same priority number may be assigned to multiple threads. As another example, a low priority thread may be assigned a first priority number and a higher priority thread may be assigned second priority number lower than the first priority number. As another example, priorities may be priority codes (e.g., a combination of letters and/or numbers) rather than priority numbers.

Priority analysis module 430 may assign priorities to threads based on the type of thread. For example, priorities may be assigned based on the frequency of I/O activity, the number of outstanding I/O operations, the time lapsed since the last I/O operation, the size of I/O operations, and/or the time lapsed since the last user interface update. Some threads must be performed when received while others may be postponed. Ordering the threads of execution may increase performance of a host since threads which must be performed may not wait in the queue for lower priority tasks (e.g., LCD refreshing) to be executed.

Although the above process is described in terms of a processor, a memory controller may receive commands for execution. Additionally, although priorities are described above as higher priority threads being assigned higher priority designations or numbers than lower priority threads, higher priority threads may be assigned lower priority designations or numbers than lower priority threads.

Algorithm 440 may be executed by the processor to determine an order of execution for the threads of execution.

Algorithm may be stored on a memory of the host and executed by any suitable logic device or other appropriate device for manipulating information in a logical manner (e.g., processor or memory controller). Algorithm may apply one or more criteria to the threads to determine an order of execution. Algorithm may determine an order of execution based on one or more characteristics of the thread of execution (e.g., type of thread). For example, algorithm may determine an order of execution at least partially based on the assigned priority and/or time in the queue 420. Once an order of execution has been determined, a sequence 450 of threads of execution may be sent by the queue 420 and/or threads of execution 450 may be sent from the queue and/or executed in the sequence determined by the algorithm.

Figure 5:
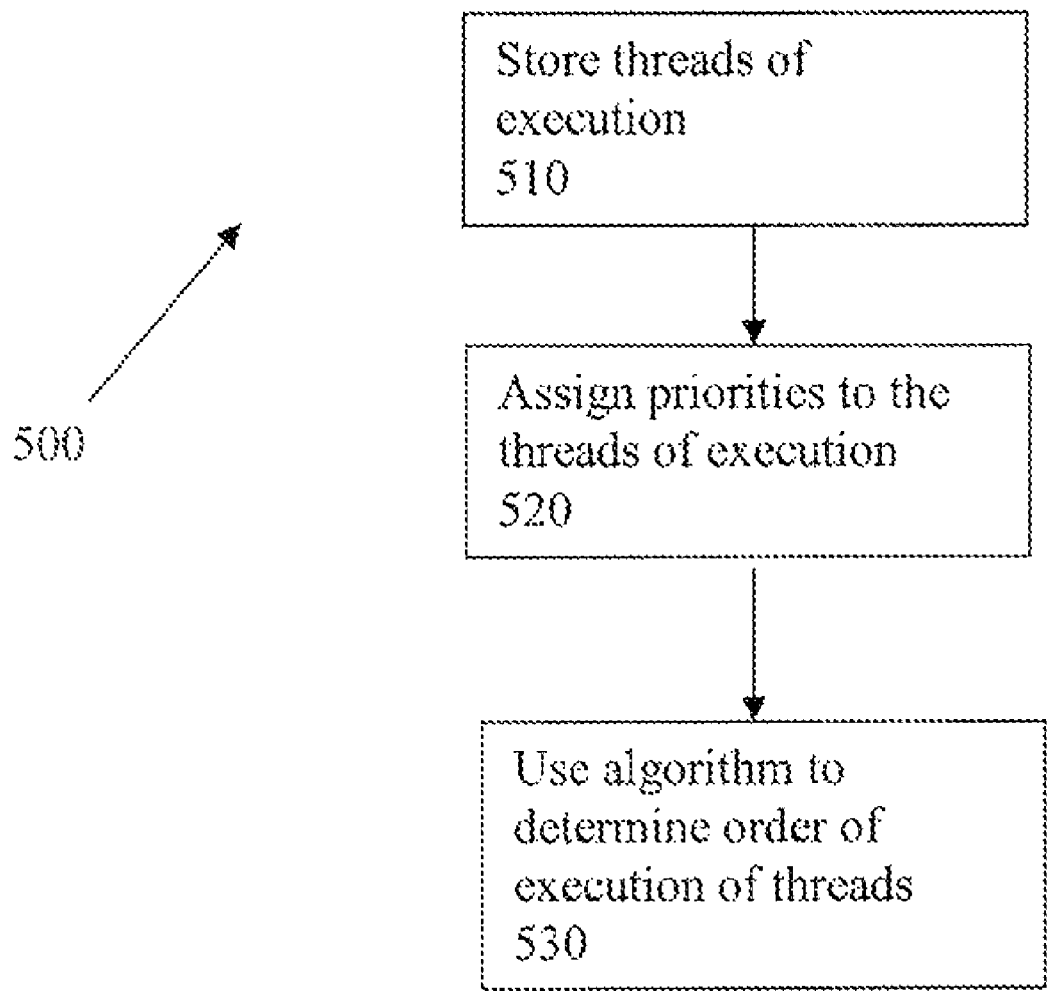
FIG. 5 illustrates an example process for assigning priorities.

FIG. 5 illustrates an example process 500 of assigning priorities to threads of execution. Threads of execution may be stored (operation 510). For example, threads of execution may be stored in a buffer (e.g., queue) of the host. The buffer may be coupled to the processor or the memory controller of the host. Threads of execution may be received from various components of the host. For example, threads of execution may be received from different stacks associated with different input/output devices and/or operations. Other components such as an LCD may also have associated stacks containing threads associated with the LCD.

Priorities may be assigned to stored threads (operation 520). Nonvolatile memory input/output threads may be assigned a lower priority designation than other input/output threads. For example, other input/output threads may be assigned a priority designation of 35 (e.g., on a scale of 0 to 100, with 0 being the highest theoretical priority and 100 being the lowest theoretical priority, while NAND input/output threads may be assigned a priority designation of 40. Other threads may be assigned lower priorities than input/output threads. For example, other threads may be assigned a higher priority than 40 to indicate a lower priority.

An order of execution of the threads may be determined using an algorithm (operation 530). For example, an algorithm may determine an order of execution for the threads based characteristics of the threads (e.g., assigned priorities, time in the buffer, and/or type of thread). The algorithm may determine an order of execution to inhibit race conditions from occurring (e.g., when two threads race each other to influence an output). The algorithm may determine an order of execution for threads to allow atomic operations (e.g., to inhibit common data from being simultaneously modified or read while in the process of being modified), as needed. The algorithm may inhibit priority inversion (e.g., when a lower priority thread uses or holds a resource required by a higher priority thread). Threads may be executed by the processor of the host in the determined order.

Figure 6:
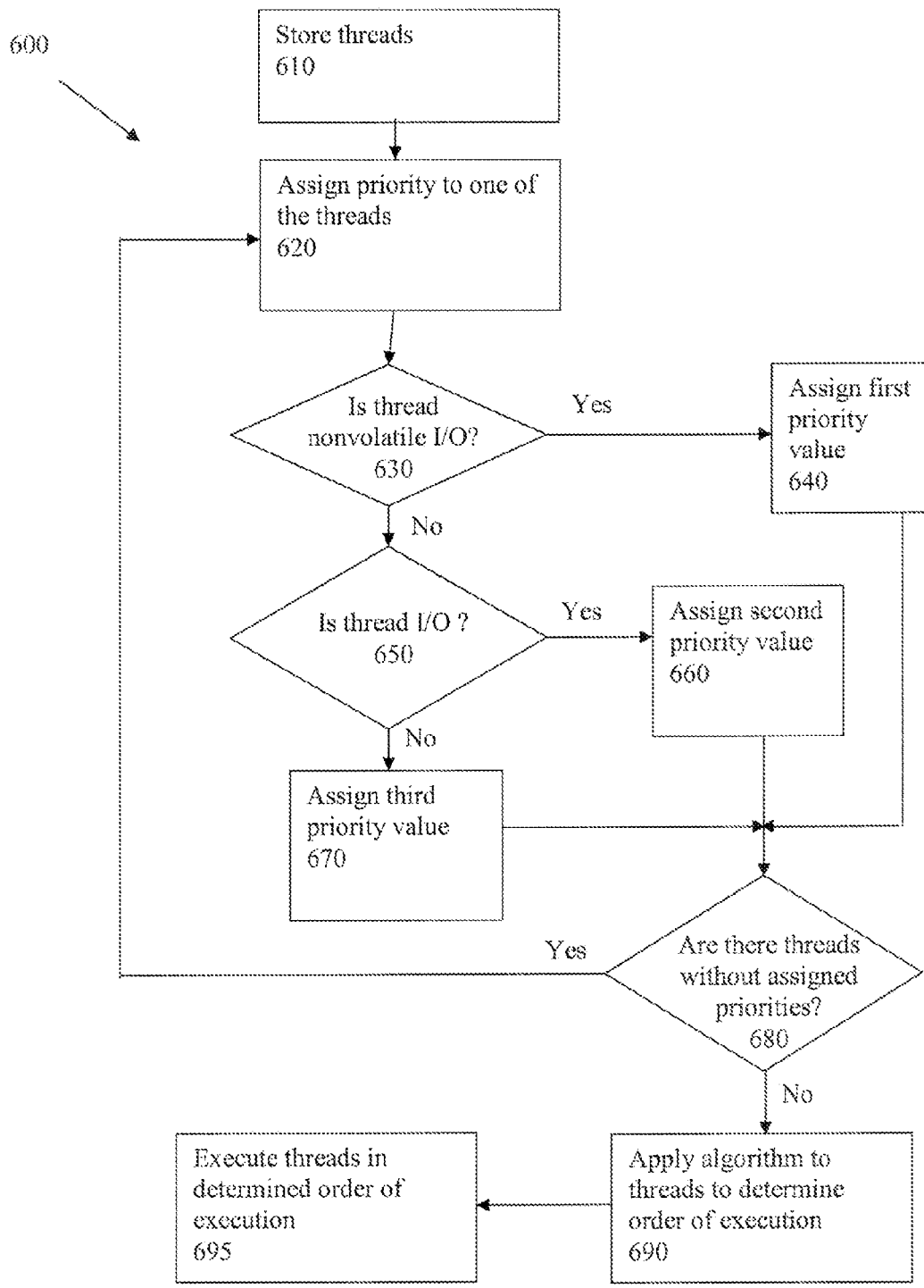
FIG. 6 illustrates an example process for assigning priorities.

FIG. 6 illustrates an exemplary process 600 for managing threads of execution. Threads of execution may be received (e.g., from one or more stacks associated with devices of or coupled to the host from an external host). Threads may be stored (operation 610). Threads may be stored in a queue.

A priority may be assigned to a thread stored in the queue (operation 620). For example, a thread in the queue may be assigned a priority designation, such as number(s) or letter(s). A priority designation may be based on the type of thread (e.g., input/output threads or LCD refresh thread).

A determination may be made whether the thread is a nonvolatile memory input/output thread (operation 630). For example, it may be determined if a thread is a flash memory input/output thread (e.g., from a stack associated with NAND flash or NOR flash). If the thread is a nonvolatile input/output thread, a first priority value may be assigned to the thread (operation 640). For example, a first priority value may be assigned to the NAND input/output threads. A priority value may be a number.

If the thread is not a nonvolatile memory input/output thread, a determination may be made whether the thread is an input/output thread (operation 650). If the thread is an input output thread, then a second priority value may be assigned to the thread (operation 660). For example, a second priority value may be assigned to input/output threads from stacks associated with a USB, network input/output threads, and/or other types of input/output threads. A second priority value may be higher (e.g., a lower number representing a higher priority) than the first priority value.

If the thread is not an input/output thread, a third priority value may be assigned to the thread (operation 670). For example, an LCD refresh thread may be assigned a third priority value. A third priority value may indicate a lower priority than the first and second priority values.

Although the above process is described in terms of three priority values, a plurality of values for priority designations may be used. A priority analysis module may apply criteria to threads to determine priority values for the threads. For example, more than three priority values may exist (e.g., 100, 50, 27) and a priority number may be assigned to a thread based on characteristics of the thread (e.g., type of thread or device the thread is associated with).

A determination may be made whether more threads need to be assigned priorities (operation 680). If more threads need to be assigned priorities, then priorities for other threads may be determined (operation 620). For example, if eight threads are received by a processor and stored in a queue, steps 620-680 may be repeated for each of the threads.

If additional threads do not need to be assigned priority, then an algorithm may be applied to the threads to determine an order of execution (operation 690). For example, an algorithm may determine an order of execution based at least partially on assigned priorities and/or time lapsed since receipt of the thread. Since threads may be continuously received, the algorithm may be continuously applied to threads pending in the queue to determine the order of execution of the pending threads. A specified number of threads may be executed prior to reapplying the algorithm. Once an order of execution has been determined, threads may be executed (operation 695). A processor of a host may execute the threads based on the determined order of execution.

In some implementations, a host may be a device with a NAND memory. A processor may receive threads of execution and store the threads in the queue coupled to the processor. Threads may be assigned priorities based on the type of threads. For example, NAND memory input/output threads (e.g., input/output threads from a stack associated with the NAND memory) may be assigned a lower priority than other input/output threads. NAND memory input/output threads may be assigned a higher priority than other threads (e.g., threads that are not input/output threads). NAND memory input/output threads may be assigned a lower priority than at least a portion of other threads. Other input/output threads (e.g., other than the NAND memory input/output thread) may be assigned a higher priority than other non input/output threads. For example, NAND input/output threads may be assigned a priority designation of 36. Other input/output threads received may be assigned a priority designation of 35. Other threads received may be assigned a priority designation of 70. Once priorities have been assigned to threads, an algorithm determines an order of execution for the threads. The algorithm may determine an order of execution at least partially based on assigned priorities. Higher priority threads may be executed prior to at least some lower priority threads. Algorithm may determine an order of execution at least partially based on time in queue so that low priority threads are not kept in the queue for periods of time longer than a specified period of time. In some implementations, algorithm may determine an order of execution at least partially based on the type of thread. For example, input/output threads from an external host may be performed prior to other input/output threads.

Although a user has been described as a human, a user may be a person, a group of people, a person or persons interacting with one or more computers, and/or a computer system, as appropriate.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to interact with a user as well. For example, feedback provided to the user by an output device may be any form of sensory feedback (e.g., visual feedback, auditory feedback, and/or tactile feedback) and/or input from the user may be received in any form, including acoustic, speech, or tactile input.

The systems and techniques described here can be implemented in a computing system that includes a back end component (e.g., as a data server), a middleware component (e.g., an application server), a front end component (e.g., a client computer with a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, the type of thread may be determined. Threads of execution stored in a queue until executed. Among other modifications, the described operations may be performed in a different order than is described and some operations may be added or deleted. For example, some types of threads of execution may not be assigned a priority. As another example, a batch of threads may be assigned priorities and sequenced. Accordingly, other implementations are within the scope of this application.

It is to be understood the implementations are not limited to particular systems or processes described. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a processor" includes a combination of two or more processors and reference to "a memory" includes mixtures of different types of memories.

What is claimed is:

1. A method for managing multiple threads of execution comprising:
    storing, in a queue, driver threads of execution including
        one or more threads from a NAND driver for NAND memory and
        at least one driver thread different from the NAND driver input/output threads; and
    assigning a lower priority in the queue to the one or more NAND driver threads than the at least one different driver thread, wherein priorities assigned to threads in the queue determine an order of execution.

2. The method of claim 1 further comprising executing the driver threads of execution at least partially based on an algorithm.

3. The method of claim 2 wherein the algorithm determines an order of execution at least partially based on assigned priority.

4. The method of claim 2 wherein the algorithm determines an order of execution at least partially based on time lapsed after receipt of a thread of execution.

5. The method of claim 1 further comprising receiving at least one of the other driver input/output threads from a USB bus coupled to the external host.

6. The method of claim 1 further comprising receiving other non-input/output threads.

7. The method of claim 6 further comprising assigning a higher priority to driver threads than the other non-input/output threads.

8. An article comprising a machine-readable non-transitory medium storing instructions for managing driver threads of execution, the instructions operable to cause data processing apparatus to perform operations comprising:
    assigning a lower priority in a queue to one or more NAND driver input/output threads than other driver input/output threads; and
    determining an order of execution for one or more of the NAND driver input/output threads and the other driver input/output threads at least partially based on an algorithm, wherein the algorithm determines an order of execution at least partially based on assigned priorities.

9. The article of claim 8 wherein the algorithm determines an order of execution at least partially based on time lapsed after receipt of a thread of execution.

10. The article of claim 8 wherein the instructions are further operable to cause data processing apparatus to perform operations comprising assigning a higher priority to one or more of the NAND driver input/output threads than other driver threads.

11. The article of claim 10 wherein the instructions are further operable to cause data processing apparatus to perform operations comprising wherein determining an order of execution further includes determining an order of execution for the other driver threads.

12. The article of claim 8 wherein the instructions are further operable to cause data processing apparatus to perform operations comprising receiving at least one of the other driver input/output threads from an external host.

13. A system comprising:
 a queue operable to store one or more driver threads of execution;
 a priority analysis module coupled to the queue, wherein the priority analysis module is operable to:
  assigning a higher priority in the queue to driver input/output threads than other threads;
  assigning a lower priority in the queue to the one or more NAND input/output threads than the other driver input/output threads; and
 an algorithm operable to determine an order of execution of the threads of execution based, at least in part, on the higher priority and the lower priority.

14. The system of claim 13 wherein the algorithm determines an order of execution at least partially based on assigned priorities.

15. The system of claim 13 wherein the algorithm determines an order of execution at least partially based on time lapsed after receipt of a thread of execution.

16. The system of claim 13 further comprising a bus coupling an external host to a host including the queue, wherein one or more of the other driver input/output threads are transmitted from the external host using the bus.

17. A system comprising:
 a means for receiving driver threads of execution, wherein the driver threads of execution comprise:
  input/output driver threads comprising:
   one or more NAND driver input/output threads; and
   different driver input/output threads;
 a means for assigning priorities operable to assign a higher priority to the different driver input/output threads than the one or more NAND driver input/output threads.

18. The system of claim 17 further comprising a means for executing the driver threads of execution.

19. The system of claim 17 further comprising a means for determining an order of execution for the driver threads of execution.

20. The system of claim 17 wherein the driver threads of execution comprises other threads, and wherein the means for assigning priorities is further operable to assign a higher priority to the driver input/output threads than the other threads.

* * * * *

UNITED STATES PATENT AND TRADEMARK OFFICE
CERTIFICATE OF CORRECTION

| | |
|---|---|
| PATENT NO. | : 8,024,731 B1 |
| APPLICATION NO. | : 11/739832 |
| DATED | : September 20, 2011 |
| INVENTOR(S) | : Michael J. Cornwell |

It is certified that error appears in the above-identified patent and that said Letters Patent is hereby corrected as shown below:

In Claim 13, Column 11, line 24, delete "assigning" and insert --assign--, therefor.

In Claim 13, Column 11, line 26, delete "assigning" and insert --assign--, therefor.

In Claim 20, Column 12, line 26, delete "comprises" and insert -- comprise --, therefor.

Signed and Sealed this
Twenty-fifth Day of October, 2011

David J. Kappos
*Director of the United States Patent and Trademark Office*